United States Patent
Nord et al.

(10) Patent No.: US 6,420,015 B1
(45) Date of Patent: Jul. 16, 2002

(54) CUSHIONED RUBBER FLOOR MAT AND PROCESS

(75) Inventors: Thomas D. Nord; Seiin Kobayashi, both of Yonezawa; Yuji Nagahama, Nishinomiya, all of (JP)

(73) Assignees: Milliken & Company, Spartanburg, SC (US); Duskin Company Limited, Osaka (JP)

( * ) Notice: Subject to any disclaimer, the term of this patent is extended or adjusted under 35 U.S.C. 154(b) by 0 days.

(21) Appl. No.: 09/671,225

(22) Filed: Sep. 27, 2000

(51) Int. Cl.[7] .................. B32B 3/00; B29C 33/58; A47G 9/06
(52) U.S. Cl. ............. 428/172; 428/161; 428/167; 264/293; 264/316; 264/320; 5/417
(58) Field of Search ............. 428/156, 161, 428/172, 167, 492, 499; 156/228, 242, 245; 264/257, 293, 316, 320; 15/215, 217, 238; 5/417, 420

(56) References Cited

U.S. PATENT DOCUMENTS

| | | | |
|---|---|---|---|
| 1,008,618 A | 11/1911 | Skowronski et al. | 428/493 |
| 1,805,038 A | 5/1931 | Derr | 428/493 |
| 3,016,317 A | 1/1962 | Brunner | 154/49 |
| 3,197,357 A | 7/1965 | Schulpen | 161/116 |
| 3,833,440 A | 9/1974 | Kashiwa et al. | 156/244 |
| 3,982,977 A | 9/1976 | Gordon | 156/72 |
| 4,045,605 A | 8/1977 | Breens et al. | 428/88 |

(List continued on next page.)

FOREIGN PATENT DOCUMENTS

| | | | |
|---|---|---|---|
| CH | 614853 | 7/1976 | A47G/27/02 |
| EP | 0325040 | 1/1990 | A47G/27/04 |
| EP | 0351041 | 1/1990 | A47G/27/02 |
| FR | 1211755 | 10/1959 | |
| FR | 2544659 | 10/1984 | B32B/5/18 |
| GB | 2213099 A | 12/1987 | B44C/1/16 |
| GB | 2244429 A | 5/1991 | A47G/27/02 |
| JP | 67224 | 6/1978 | A47G/27/02 |
| JP | 2112437 | 4/1990 | D03D/27/00 |
| WO | 9530040 | 11/1995 | D05C/15/04 |
| WO | 9637645 | 11/1996 | D02G/3/04 |
| WO | 9904942 | 2/1999 | B26D/1/03 |

Primary Examiner—Donald J. Loney
(74) Attorney, Agent, or Firm—Terry T. Moyer; Daniel R. Alexander

(57) ABSTRACT

This invention relates to a cushioned dust control mat or article wherein the mat comprises at least two distinct layers of rubber, one comprising foam rubber, the other comprising solid rubber and has a plurality of star-shaped protrusions in the upper surface thereof. Also, the surface of the mat between the protrusions is ribbed or recessed. The solid rubber layer is present over the foam rubber layer on the top side of the mat in which the plurality of star shaped rubber protrusions are present to provide cushioning characteristics. The solid rubber layer acts as a cap or barrier for the foam rubber layer, particularly over the star shaped protrusions, in order to provide a mat which is resilient, will not easily degrade in its modulus strength after appreciable use and/or washing within industrial cleaning processes, and will not exhibit appreciable cracking or breaking, particularly within the star-shaped protrusions, after standard use for pedestrian traffic. A method of producing such an inventive cushioned floor mat is also provided.

20 Claims, 15 Drawing Sheets

U.S. PATENT DOCUMENTS

| | | | | |
|---|---|---|---|---|
| 4,143,916 A | * | 3/1979 | Trotman et al. | 5/347 |
| 4,262,048 A | | 4/1981 | Mitchell | 428/99 |
| 4,332,847 A | | 6/1982 | Rowland | 428/156 |
| 4,353,944 A | | 10/1982 | Tarui | 428/74 |
| 4,377,016 A | | 3/1983 | Niermeiier | 15/215 |
| 4,439,475 A | | 3/1984 | Lang | 428/92 |
| 4,465,720 A | | 8/1984 | Bell et al. | 428/85 |
| 4,587,148 A | | 5/1986 | Campbell et al. | 428/88 |
| 4,710,415 A | | 12/1987 | Slosberg et al. | 428/48 |
| 4,711,191 A | | 12/1987 | Schwartz | 112/410 |
| 4,741,065 A | | 5/1988 | Parkins | 15/217 |
| 4,794,027 A | | 12/1988 | Hering | 428/68 |
| 4,820,566 A | | 4/1989 | Heine et al. | 428/88 |
| 4,822,669 A | | 4/1989 | Roga | 428/287 |
| 4,886,692 A | | 12/1989 | Kerr et al. | 428/82 |
| 4,902,465 A | | 2/1990 | Kerr et al. | 264/257 |
| 4,902,554 A | | 2/1990 | Lang | 428/195 |
| 5,055,333 A | | 10/1991 | Heine et al. | 428/88 |
| 5,170,526 A | | 12/1992 | Murray | 15/215 |
| 5,227,214 A | | 7/1993 | Kerr et al. | 428/95 |
| 5,304,272 A | | 4/1994 | Rohrbacker et al. | 156/209 |
| 5,305,565 A | | 4/1994 | Nagahama et al. | 52/177 |
| 5,443,885 A | | 8/1995 | Wilson | 428/121 |
| 5,645,914 A | | 7/1997 | Horowitz | 428/81 |
| 5,902,662 A | | 5/1999 | Kerr | 428/95 |
| 5,928,446 A | | 7/1999 | Rockwell, Jr. et al. | 156/72 |
| 5,932,317 A | | 8/1999 | Kerr | 428/192 |
| 6,303,068 B1 | | 10/2001 | Kerr et al. | 264/293 |
| 6,340,514 B1 | | 1/2002 | Kerr et al. | 428/159 |

* cited by examiner

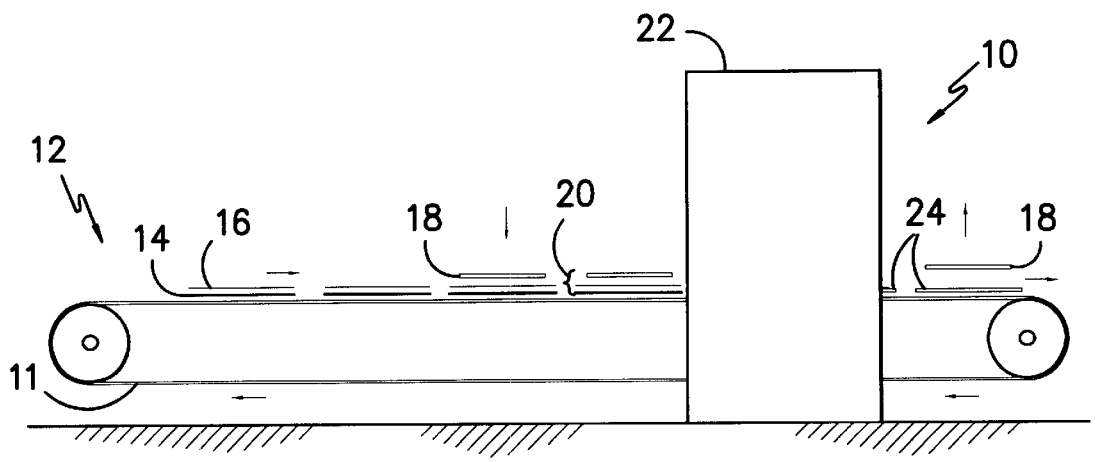
FIG. -1-
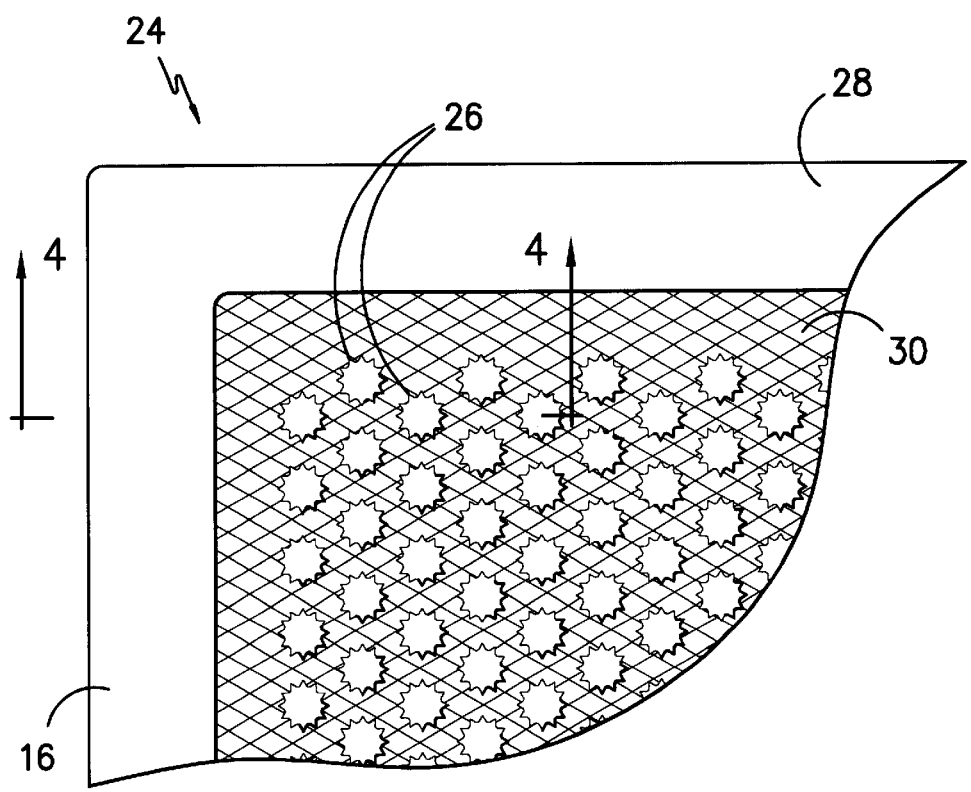
FIG. -2-

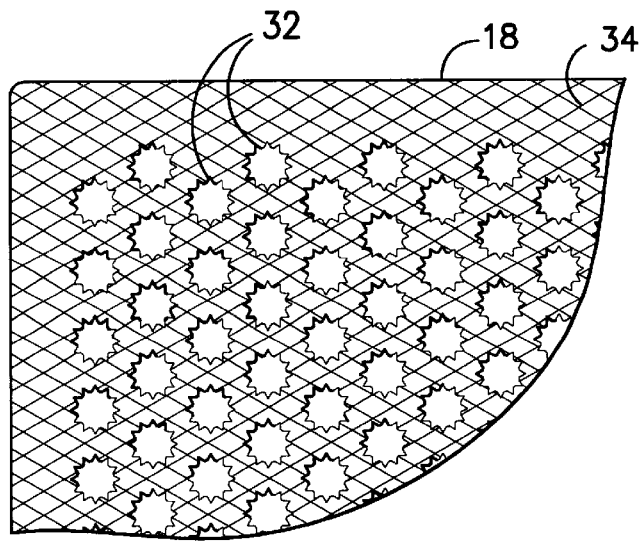
FIG. -3-
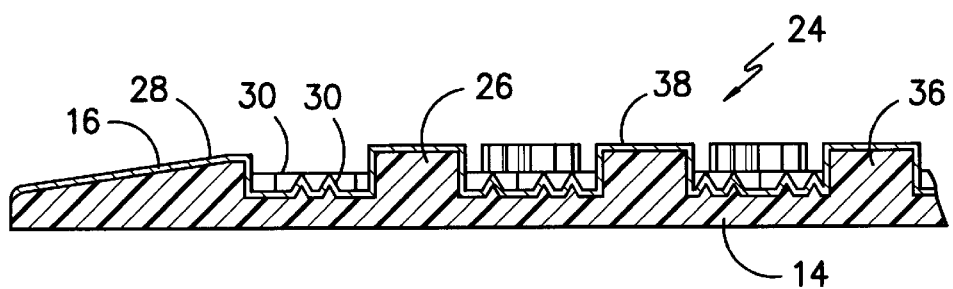
FIG. -4-

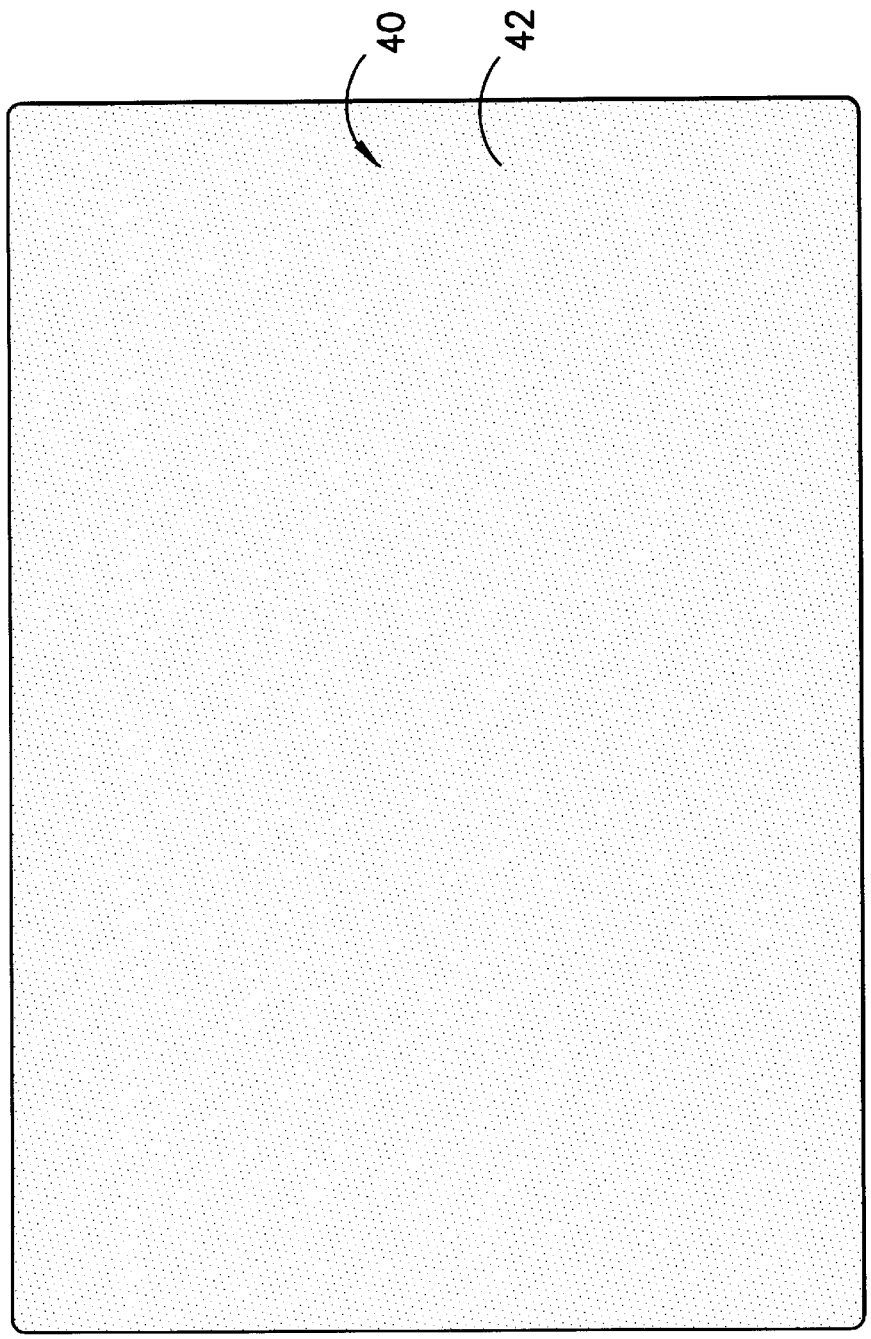

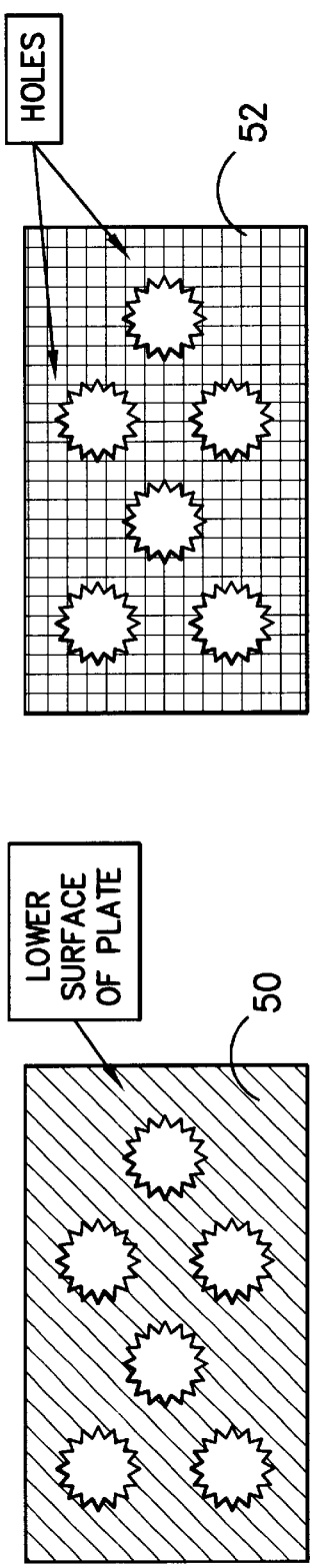
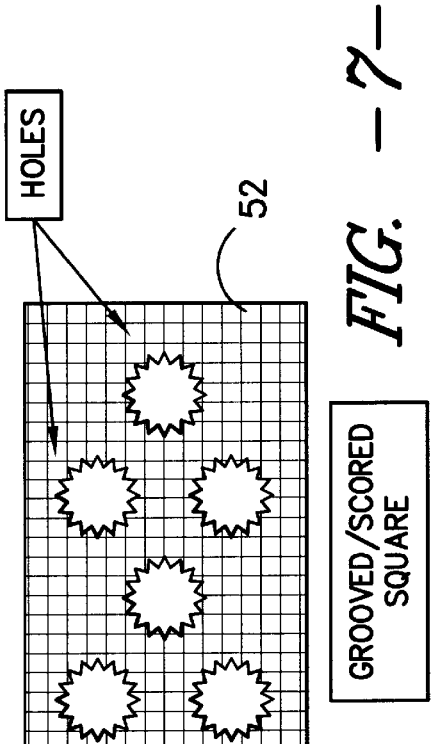
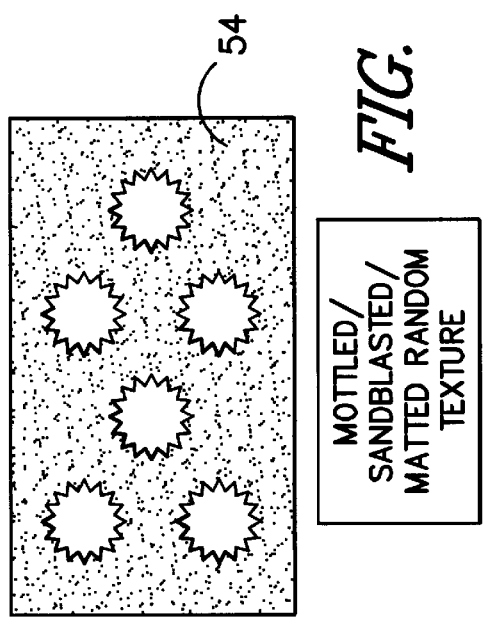
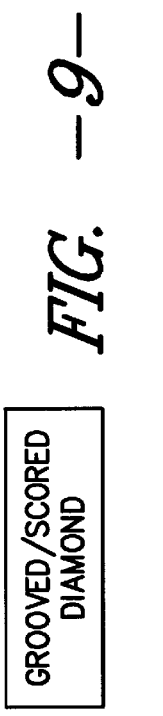

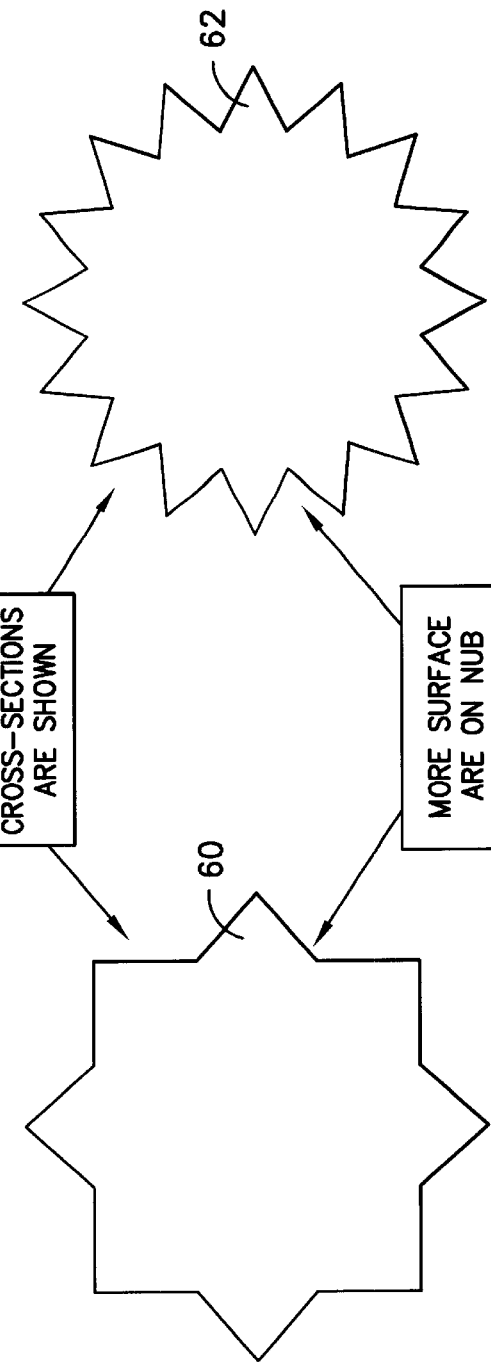
TEXTURED NUB EXAMPLES
CROSS-SECTIONS ARE SHOWN
MORE SURFACE ARE ON NUB HELPS CAPTURE MORE DIRT, OIL, DEBRIS, ETC.
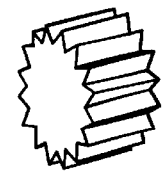
FIG. -11-
3-D VIEW OF NUB WITH ABOVE DESIGN
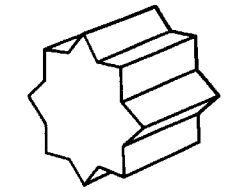
FIG. -10-
3-D VIEW OF NUB WITH ABOVE DESIGN

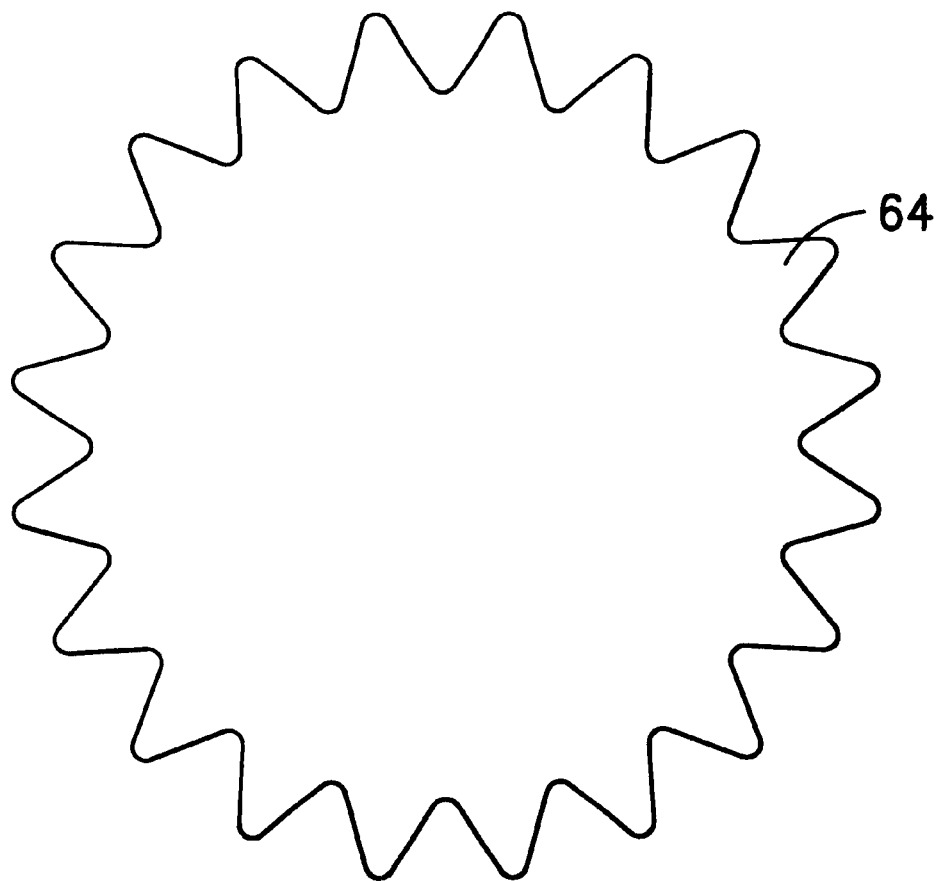
FIG. —12—

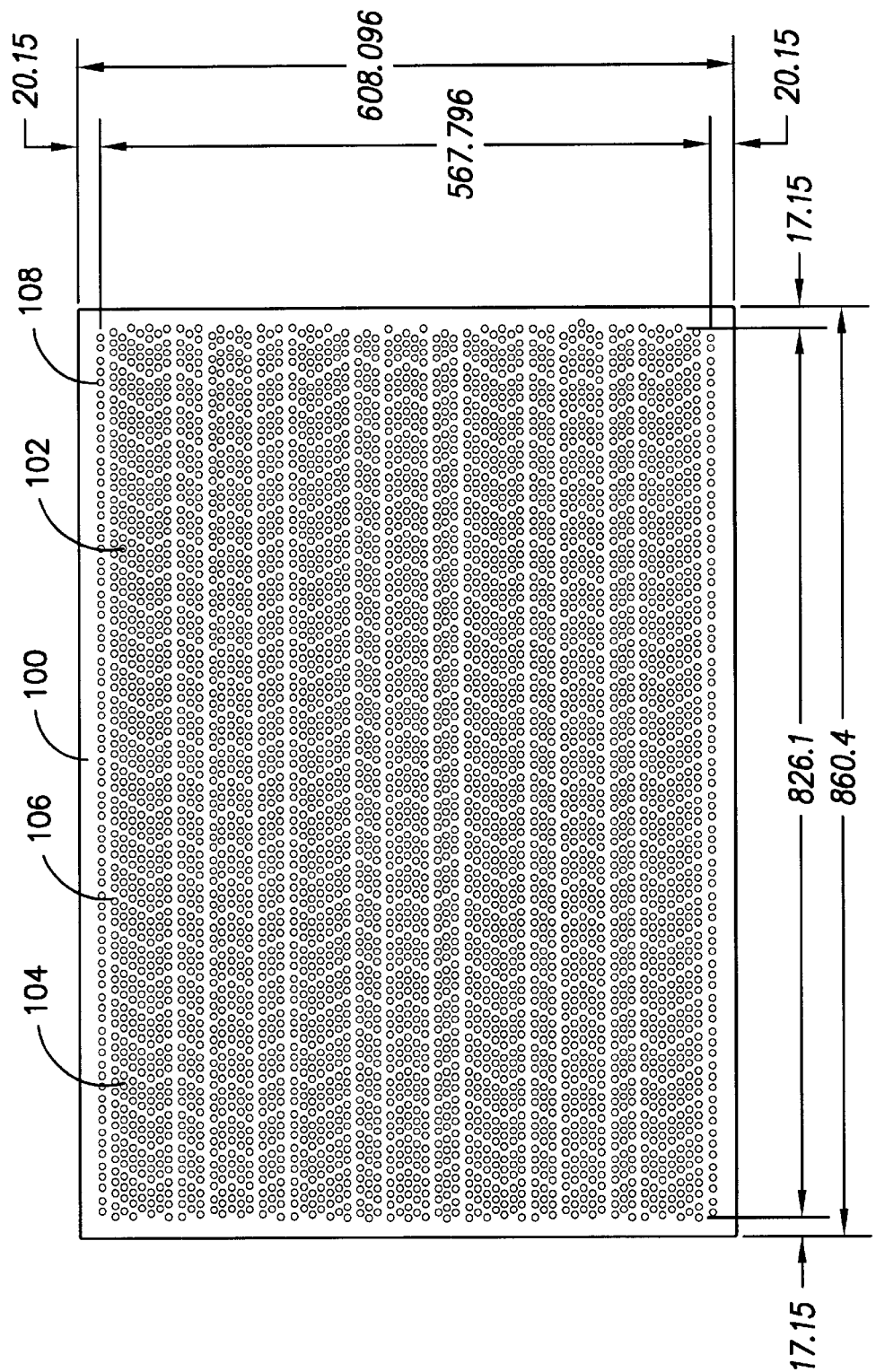
FIG. -13-

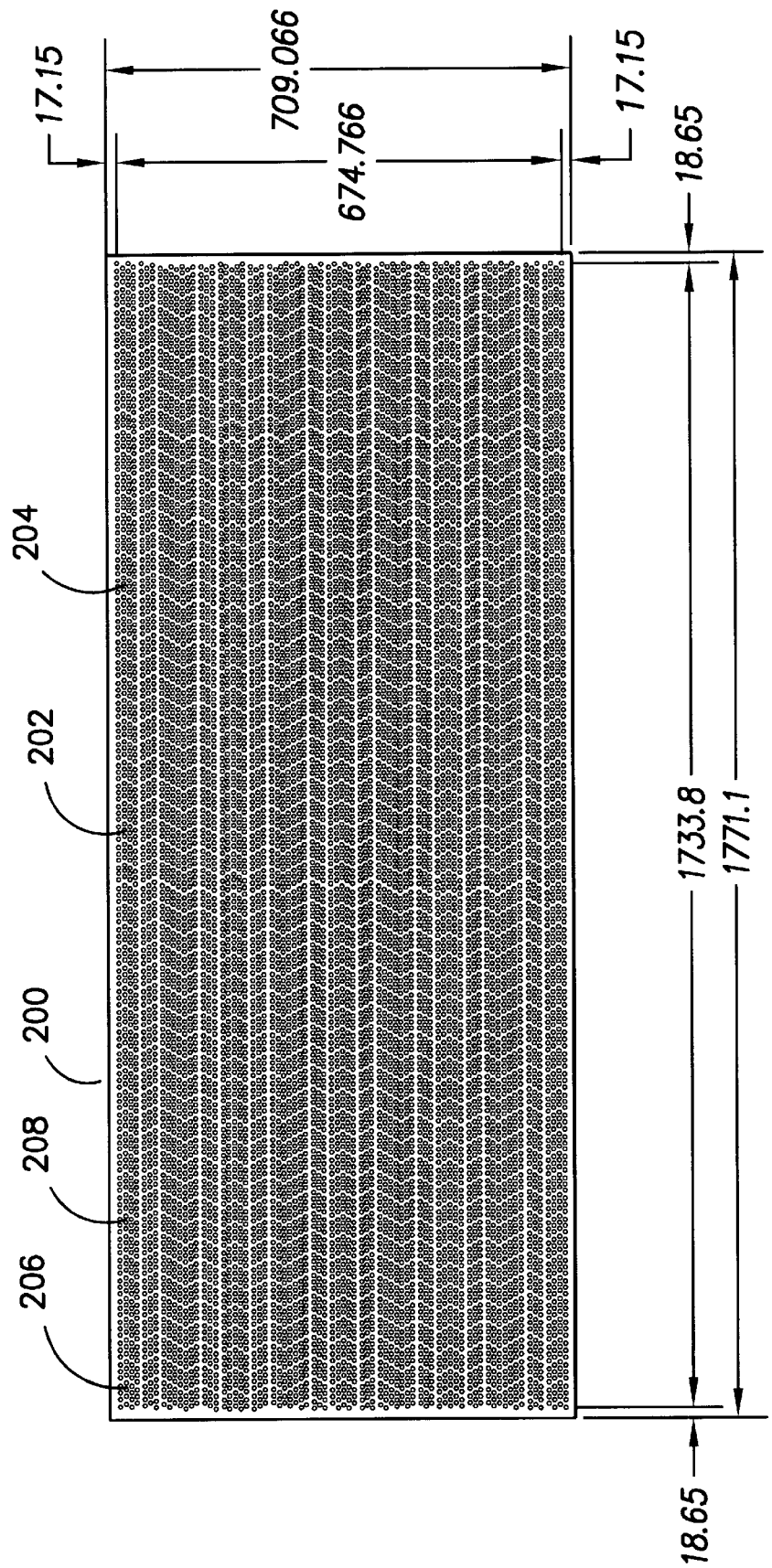
FIG. -14-

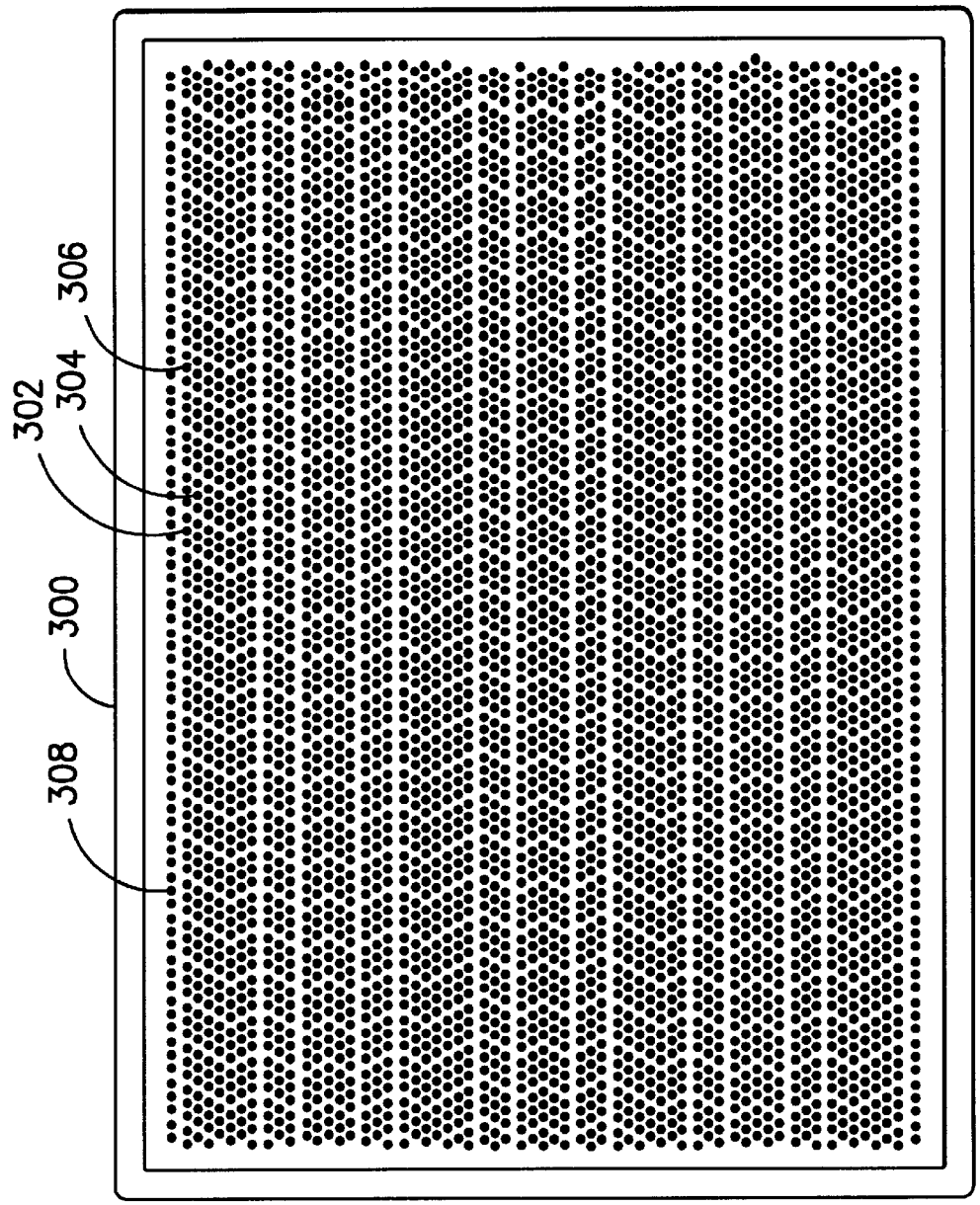
FIG. -15-

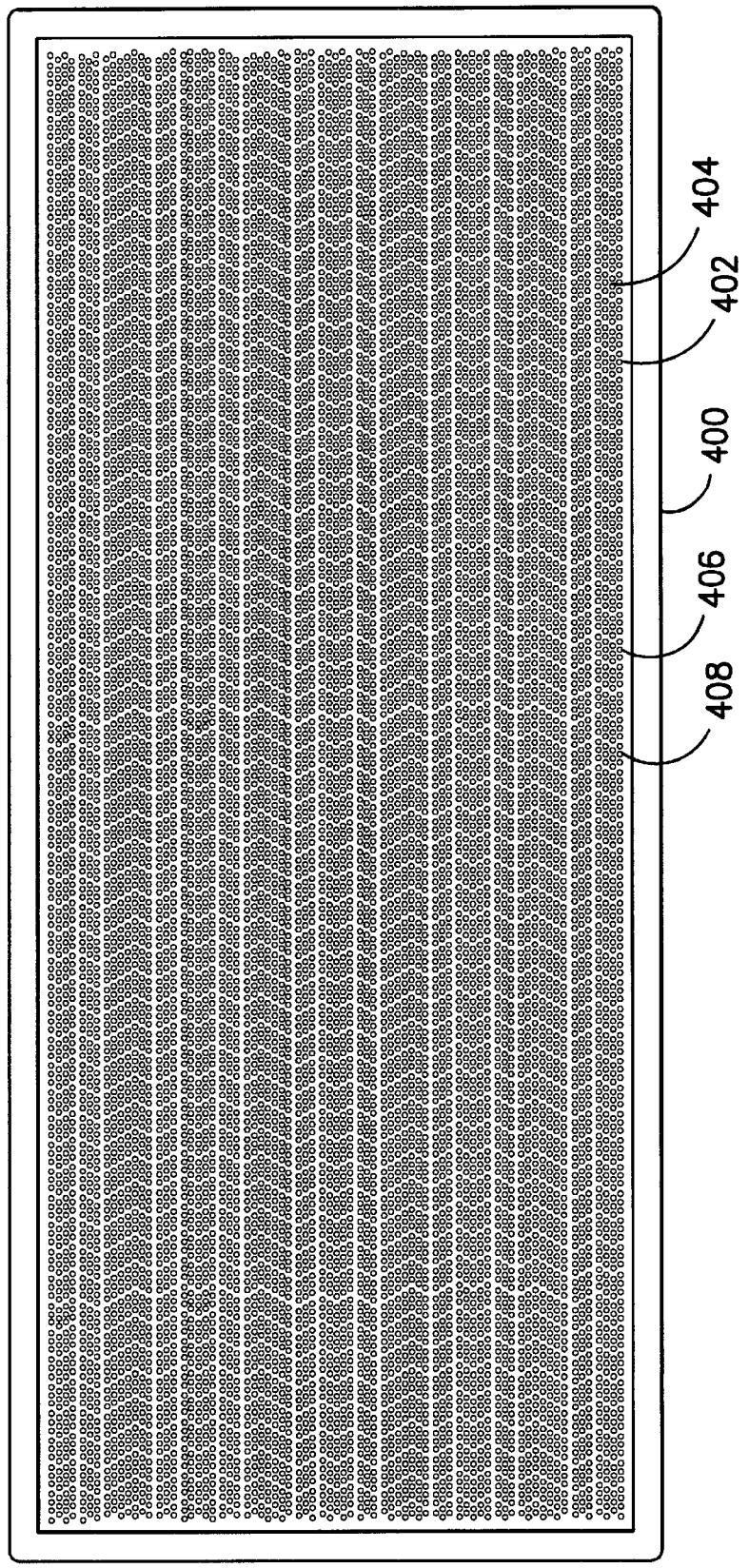
FIG. -16-

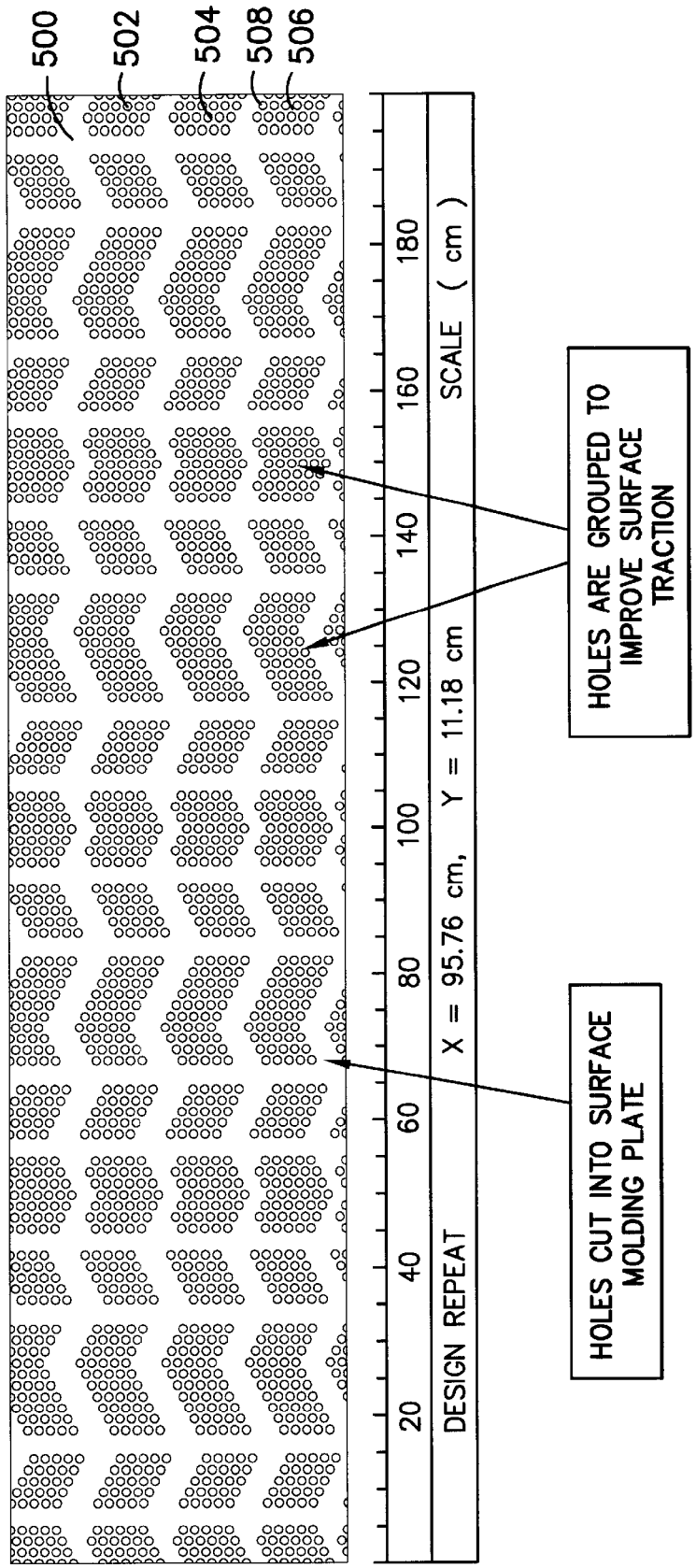
FIG. -17-

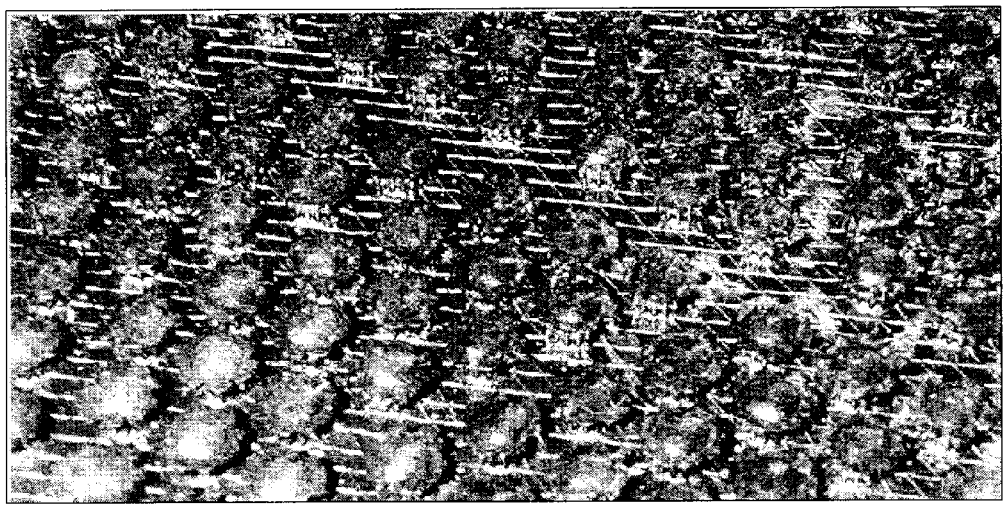
FIG. −18−

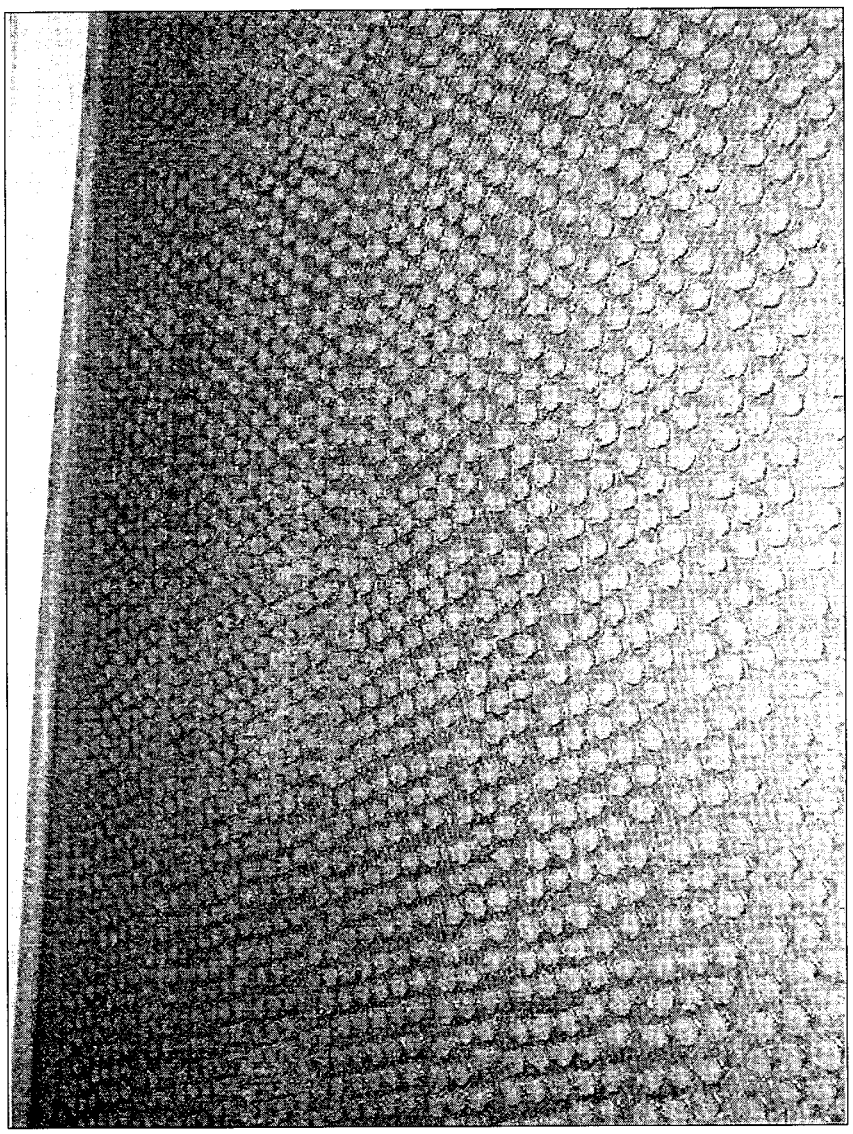
FIG. -19-

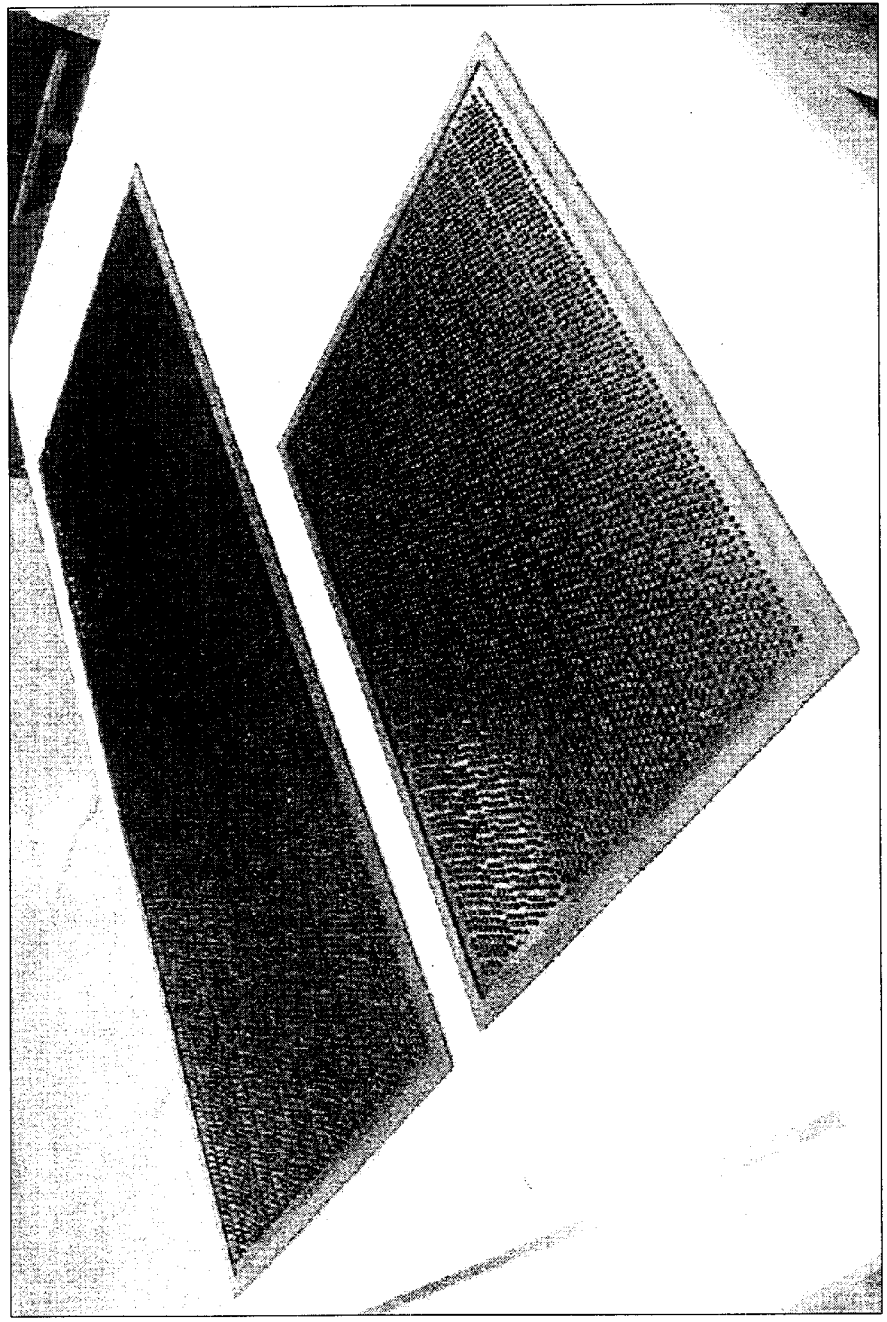
FIG. -20-
RUBBER CUSHION MATS

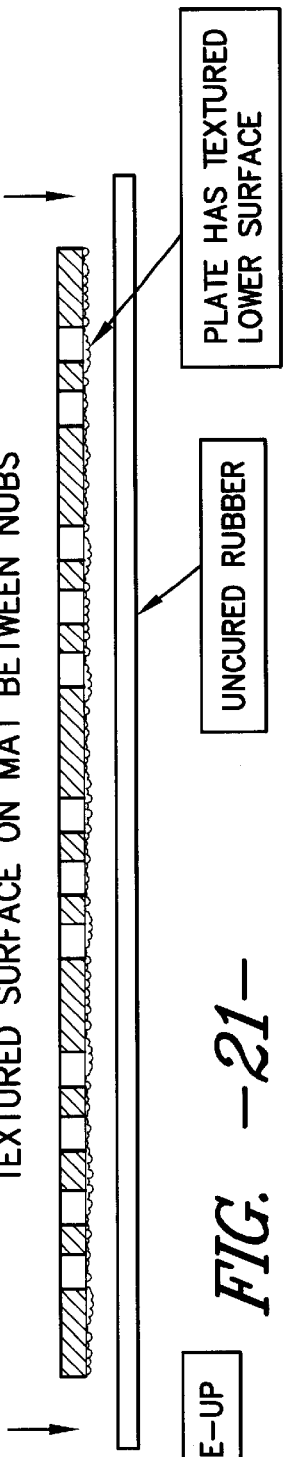

FIG. -21-

1. MAT MAKE-UP

HOW PLATE WITH TEXTURED SURFACE CREATES TEXTURED SURFACE ON MAT BETWEEN NUBS

PLATE HAS TEXTURED LOWER SURFACE

UNCURED RUBBER

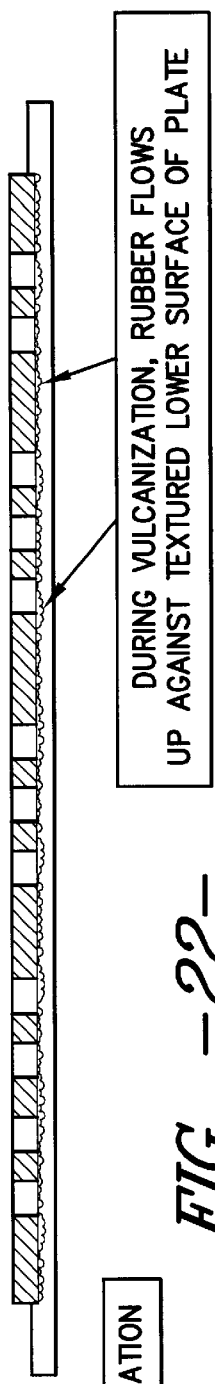

FIG. -22-

2. VULCANIZATION

DURING VULCANIZATION, RUBBER FLOWS UP AGAINST TEXTURED LOWER SURFACE OF PLATE

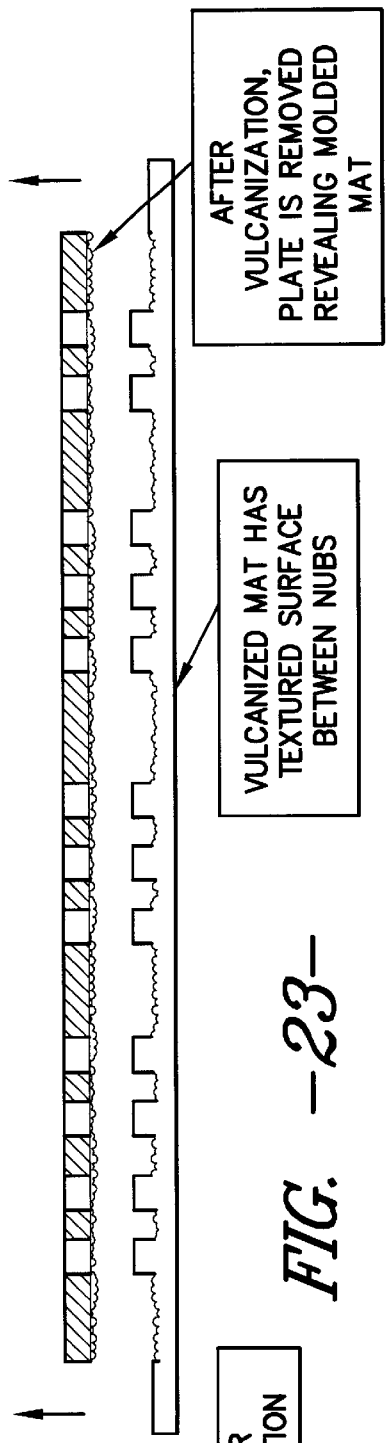

FIG. -23-

3. AFTER VULCANIZATION

AFTER VULCANIZATION, PLATE IS REMOVED REVEALING MOLDED MAT

VULCANIZED MAT HAS TEXTURED SURFACE BETWEEN NUBS

CUSHIONED RUBBER FLOOR MAT AND PROCESS

FIELD OF THE INVENTION

This invention relates to a cushioned dust control mat or article. In one embodiment, the mat comprises at least two distinct layers of rubber, one comprising foam rubber, the other comprising solid rubber. The solid rubber layer is present over the foam rubber layer on the side of the mat in which at least one. integrated rubber protrusion is present to provide cushioning characteristics. The solid rubber layer acts as a cap or barrier for the foam rubber layer, particularly over the integrated protrusion or protrusions, in order to provide a mat which is resilient, will not easily degrade in its modulus strength after appreciable use and/or washing within industrial cleaning processes, and will not exhibit appreciable cracking or breaking, particularly within the integrated protrusion(s), after standard use for pedestrian traffic. A method of producing such an inventive cushioned floor mat article is also provided.

BACKGROUND

All U.S. patent cited herein are hereby fully incorporated by reference.

As described U.S. patent application Ser. No. 09/374,707, filed Aug. 13, 1999, now U.S. Pat. No. 6,340,514, and in corresponding Japan Patent Application No. 353345/99, filed Dec. 13, 1999, floor mats have long been utilized to facilitate the cleaning of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoors. As will be appreciated, such mats by their nature must undergo frequent repeated washings and dryings so as to remove the dirt and debris deposited thereon during use. These mats are generally rented from service entities which retrieve the soiled mats from the user and provide clean replacement mats on a frequent basis. The soiled mats are thereafter cleaned and dried in an industrial laundering process (such as within rotary washing and drying machines, for example) or by hand and then sent to another user in replacement of newly soiled mats.

Uncarpeted anti-fatigue dust control mats have been made in the past comprised of dense rubber, scrap rubber, sponge-like material, including PVC, vinyl polymers, and polyurethanes, as well as recycled tire rubber. The mats are generally not able to be washed in industrial cleaning applications (such as rotary washing machines) since they are either too heavy or dense (and thus either damage the machine or themselves) or either deteriorate too easily (since sponge-like materials are easy to tear apart, particularly in rotary cleaning applications). Such washability is a key to providing a suitable floor mat article within the standard rental laundry market. As such, it has been very difficult to produce uncarpeted cushioned floor mats which exhibit sufficient strength to withstand vigorous cleaning and laundering associated with industrial rental laundry services. Foam rubber has only recently been utilized within dust control mats as a manner of reducing the overall mass of the mat article to facilitate movement and cleaning (such as in U.S. Pat. No. 5,305,565 to Nagahama et al.). Also, cushioned mats have been produced, generally including portions of the mat which contain discrete areas of integrated rubber increasing the surface area of the mat in three axes, which thereby provide cushioned areas on which a pedestrian may step.

However, other than as described in previously mentioned U.S. application Ser. No. 09/374,70, now U.S. Pat. No. 6,340,514, and Japan application 353345/99, there have not been any mats comprising integrated rubber protrusions which not only permit repeated industrial washings without exhibiting appreciable degradation of the mat structure but also provide excellent cushioning effects to pedestrian users for more comfortable floor and ground covering as well as provide a surface to clean such pedestrians' footwear. As such, there is a need to provide an improved durable, cushioned dust control mat and method.

DESCRIPTION OF THE INVENTION

It is thus an object of this invention to provide a durable, cushioned dust control mat which permits cleaning of a pedestrian's footwear. Furthermore, it is an object of the invention to provide a durable, cushioned dust control mat in which the cushioning aspects are provided by at least one integrated rubber protrusion produced during the necessary vulcanization process. Still other objects of the invention is to provide a cushioned all-rubber floor mat which retains its cushioning characteristics and shape upon use and can be laundered repeatedly within industrial rotary washing machines without damaging such machines or themselves.

Accordingly, one embodiment of this invention encompasses a rubber floor mat structure comprising at least two separate layers of rubber wherein said at least two layers comprise a first layer comprised of foam rubber; and a second layer comprised of solid rubber;

wherein at least one protrusion integrated within said rubber mat structure is present having a core portion and an outside surface portion, wherein the core portion of said at least one protrusion is comprised of said first layer of foam rubber, wherein the outside surface portion of said at least one protrusion is comprised of said second layer of solid rubber, and wherein the protrusions are star shaped and the mat surface in the area surrounding the protrusions is ribbed or grooved to provide additional cleaning of a pedestrian's footwear.

Further, the protrusions are preferably arranged in a tire tread like arrangement or footprint with groups and rows of groups of protrusions.

The first rubber layer may be comprised of any standard rubber composition, including, but not limited to, acrylonitrile-butadiene rubber (NBR), styrene-butadiene rubber (SBR), carboxylated NBR, carboxylated SBR, chlorinated rubber, silicon-containing rubber, and the like, all of which must include a blowing agent to form the necessary closed-cell structure of the resultant foam rubber, such as in U.S. Pat. No. 5,305,565 to Nagahama et al. For cost purposes, the preferred rubbers are NBR, SBR, and blends thereof.

As noted above, the foam rubber component is important in this inventive floor mat. Dust control mats have exhibited general problems arising from frequent washings and harsh environments of use. First, the energy required to wash and dry a typical floor mat is significant due to the overall mass of the mats. The overall mass is most significantly attributed to the mass of the rubber within the mat. As will be appreciated, a reduction in the overall mass of the floor mat will result in a reduced energy requirement in washing and drying the mat. Moreover, a relative reduction in the mass of the rubber provides a substantial benefit. Thus, the utilization of a lighter weight rubber composition, such as foam rubber, in at least a portion of the dust control mat of the present invention includes a rubber backing sheet which may possess a specific gravity which is approximately 25 to 35 percent less then the rubber sheets of typical prior floor mats. Accordingly, a foam rubber is the bottom layer of the mat and the core layer of the integrated rubber protrusion(s) of this invention. Such a foam rubber layer is present as a thicker layer than the solid rubber cap (generally). The target thickness for such a first layer is from about 15 to about 500 mils, preferably from about 25 to about 400 mils, more preferably from about 40 to about 350 mils, and most preferably from about 75 to about 250 mils. The resultant lighter weight of the mat structure thus translates into a reduced possibility of the mat harming either the washing or drying machine in which the mat is cleaned, or the mat. being harmed itself during such rigorous procedures. Although the inventive floor mat must withstand the rigors of industrial machine washing, hand washing and any other manner of cleaning may also be utilized. Foam rubber also permits the retention or return to the original shape of the mat after continuous pedestrian use. Overall, the inventive floor mat provides an article which will retain its aesthetically pleasing characteristics over a long period of time and which thereby translates into reduced costs for the consumer.

The second rubber layer preferably comprises a solid rubber composition. Such a solid rubber may be comprised of any standard type of rubber, such as acrylonitrile-butadiene (NBR) or styrene-butadiene (SBR), or carboxylated derivatives of such butadienes, EPDM, and the like (i.e., those noted above but without the addition of a blowing agent), all merely as examples. Preferably, the second layer is comprised of NBR. The target thickness for such a second layer is from about 2 to about 50 mils, preferably from about 5 to about 40 mils, more preferably from about 10 to about 35 mils, and most preferably from about 15 to about 25 mils. This layer is preferably placed on top of the foam rubber first layer as to cover the entire first layer prior to vulcanization. However, this second layer may also merely cover a portion of the first layer, if desired. The first and second layers are calendered together, placed on the belt, and then a die mold is placed on top of the second layer which comprises openings through which molten rubber may flow during vulcanization and pressing of the structure. The high pressures (about 15 to about 50 psi, preferably 20 to 40 psi) and temperatures (about 250 to about 400° F., preferably from about 320 to about 385° F.) associated with vulcanization thus melt and force a certain amount of the two layers through the die mold openings. The denser solid rubber does not permit the less dense blown foam rubber to protrude through the solid rubber layer during this procedure. As such, the resultant protrusions possess foam rubber cores and solid rubber caps. Such protrusions add to the overall surface of the top of the mat structure, thus the solid rubber layer is appreciably thinner after vulcanization and molding than after the initial placement step. However, the solid rubber layer still remains intact and possesses sufficient strength to protect the foam rubber from contact with pedestrians' footwear, atmospheric conditions, and sunlight. The resultant mat thus is intended to be used with the protrusions facing toward the pedestrian. The inventive mat possess a two-layer structure with accompanying protrusions therein.

Furthermore, a significant problem exists within this field concerning the deterioration of the carbon—carbon double bonds in the matrix of the rubber backing sheet due to the exposure of the sheets to an oxidizing environment during use and cleaning. Specifically, the exposure of the mats to oxidizing agents during the washing and drying process tends to cleave the carbon-carbon double bonds of the rubber sheet thereby substantially embrittling the rubber which leads to cracking under the stress of use. In addition to the laundering process, the exposure of the mats to oxygen and ozone, either atmospheric or generated, during storage and use leads to cracking over time. The mat of the present invention may thus include an ozone-resistance additive, such as ethylene-propylene-diene monomer rubber (EPDM), as taught within U.S. Pat. No. 5,902,662, to Kerr, which provides enhanced protection to the rubber backing sheet against oxygen in order to substantially prolong the useful life of the mat. Such an additive also appears to provide a reduction in staining ability of such rubber backed mats upon contact with various surfaces, such as concrete, wood, and a handler's skin, just to name a few, as discussed in U.S. patent application Ser. No. 09/113,842 now U.S. Pat. No. 6,159,516 to Rockwell, Jr.

The term "integrated rubber protrusion" is intended to encompass any type of protrusion from the rubber mat sheet which is formed from the same rubber compositions of the required two separate layers of rubber and is not attached in any manner to the resultant backing sheet after vulcanization. Thus, such a protrusion would be produced through the melting of the rubber composition during vulcanization and allowing molten rubber to flow through a die mold in a position in which it remains until it cures and sets. As noted above, the majority of the mat structure (the first layer) is a rubber including a blowing agent (to produce a foam rubber) and a second layer of solid rubber covers this foam rubber portion. In such a manner, the protrusions are formed with a core of foam rubber and a cap of solid rubber upon vulcanization through a die-mold. The separate protrusions thus provide discrete areas of relaxed stress within the inventive mat (particularly with the core of softer foam rubber) which thus provides a cushioning effect to a pedestrian, greater than for an overall flat foam rubber structure.

With regard to the die, it may be constructed of any material which can withstand vulcanization temperatures (i.e., between about 250° F. and about 400° F.) and pressures (i.e., between about 15 psi and 50 psi, generally). Thus, any metal may be utilized, such as steel, aluminum, titanium, and the like. Preferably, the die is made of steel or aluminum, is generally square or rectangular in shape, and comprises holes throughout to ultimately form the desired protrusions. Preferably, such holes are multi-point star shaped with the same shape throughout the die from one surface to the other. The preferred procedure is outlined more particularly below.

The inventive mat provides a long-lasting, industrially washable, cushioned rubber floor mat which provides comfort to users as well as significantly increased duration of utility and continuity of aesthetic and modulus strength characteristics. All of this translates into reduced cost for the consumer as costs to produce are lower, the need to replace such mats is greatly reduced over other anti-fatigue, cushioned mat products, and possible medical and insurance costs may also be reduced with the utilization of such specific cushioned mats which also work to remove dirt and moisture from pedestrians' footwear.

BRIEF DESCRIPTION OF THE DRAWINGS

FIG. 1 is a schematic representation of a floor mat manufacturing machine and process.

FIG. 2 is an partial top view of a preferred embodiment of the inventive floor mat.

FIG. 3 is an partial bottom view of the preferred die.

FIG. 4 is a partial cross-sectional view along lines 4—4 of FIG. 2.

FIG. 5 is a bottom or back view of the mat of FIGS. 1, 2 and 4.

FIGS. 6–9 are respective schematic bottom view illustrations of dies or plates in accordance with other embodiments of the present invention.

FIGS. 10–12 are respective schematic enlarged top view illustrations of alternative protrusions in accordance with the present invention.

FIGS. 13–17 are respective schematic top view illustrations of die molds and corresponding floor mats in accordance with alternative embodiments of the present invention.

FIGS. 18–20 are respective photographic representations of particular examples of the present invention.

FIGS. 21–23 are schematic side view illustrations of a mat manufacturing process of the present invention.

DETAILED DESCRIPTION OF THE DRAWINGS

While the invention will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as defined by the appended claims.

Turning now to the drawings wherein like elements are designated by like reference numerals in the various views, FIG. 1 shows a floor mat manufacturing machine 10 and process for producing the inventive dust control mat 24. The machine 10 comprises a conveyor belt 11 which carries the mat components 14, 16 from an initial placement area 12 through a vulcanization chamber or press 22. Thus, a calendered composite of the first layer of rubber (including a blowing agent) 14 and the second solid rubber layer 16 is placed on belt 11. Next, a metal die or plate 18 is placed on top of layer 16. The first rubber layer 14 has a thickness of about 90 mils and the second solid rubber layer 16, being much thinner, has a thickness of about 15 mils. The resultant combination 20, including the metal die 18, is then moved into the vulcanization chamber 22, which includes a heated press (not illustrated) to subject the mat components to a temperature of about 350° C. and a pressure of about 30 psi. After vulcanization, die 18 is removed from the mat 24.

FIG. 2 gives a more detailed top view of the inventive mat 24. The top cover for the mat 24 is the second solid rubber layer 16 (FIGS. 2 and 4). In an alternative embodiment, the second solid rubber layer may cover only a portion of the foam rubber layer (14 of FIGS. 1 and 4). The inventive mat 24 includes integrated star shaped rubber protrusions 26 which protrude from the mat 24. These protrusions 26 provide the cushioning benefits as described more fully above for an anti-fatigue floor covering product.

Anti-fatigue mat 24 further includes a raised border or edge 28. The surface of mat 24 between the protrusions 26 and the border 28 includes a plurality of crossing ridges or ribs 30. The protrusions 26 are preferably taller or higher than the ribs 30.

The preferred die 18 is more thoroughly depicted in FIG. 3. The die is preferably about $\frac{1}{10}$–2 inches tall, preferably $\frac{1}{10}$–$\frac{1}{2}$ inch tall, and made of steel or aluminum. Any material may be used for this die 18 as long as it can withstand vulcanization temperatures and pressures without distorting its shape or permanently adhering to the mat product 24 of FIG. 1 (such as metals like steel, titanium, aluminum, and the like). The preferred die 18 comprises a plurality of cut-outs or openings 32 which are, again preferably, star shaped in configuration, having a diameter of about 0.1–1 inch, preferably about 0.1–0.5 inch and a depth of $\frac{1}{10}$–2 inches, preferably $\frac{1}{10}$–$\frac{1}{2}$ inch. It is through these holes 32 that the rubber composition of the first foam rubber layer (14 of FIG. 1) and the second solid rubber layer (16 of FIG. 1) are pressed to ultimately form the desired protrusions (26 of FIGS. 2 and 4) on the top side of the preferred mat (24 of FIG. 1).

The die 18 also includes a plurality of v-shaped grooves or recesses 34 which create the crossed ribs or ridges 30 of mat 24. The ridges or ribs 30 may have a height of about 0.1 cm. Although the grooves 34 and ribs 30 are shown in a diamond crossing pattern, it is contemplated that other patterns 50, 52, 54, 56 may be used as shown in FIGS. 6–9 of the drawings. Further, the ribs 30 can be instead recesses or grooves created by ribs or ridges on the bottom of die 18. Also, although the protrusions 26 are shown to be multi-point star shaped, it is to be understood that the protrusions may be other star like shapes 60, 62, 64 as shown in FIGS. 10–12 of the drawings.

FIG. 4 shows a cross-section of a portion of the finished inventive floor mat 24. Protrusions 26 have been formed comprising a foam rubber core 36 from the first rubber layer 14 and a cap 38 comprising the second solid rubber layer 16. The resultant preferred star-shaped protrusions 26 are each about 0.1–1 inch, preferably 0.25 inch, in diameter and about $\frac{1}{10}$–2 inches, preferably 0.12 inch, in height. The thickness of the solid rubber layer 16 after vulcanization has been reduced from about 15 mils to about 10 mils due to the associated pressures and the forcing of the rubber compositions 14, 16 through the metal die (18 of FIGS. 1 and 3) during vulcanization.

With reference to FIG. 5 of the drawings, the back or lower surface 40 of the mat 24 preferably has a roughened, textured, dimpled, or textile like surface texture 42. This enhances the anti-creep aspect of the mat 24.

FIGS. 13–14 and 17 depict respective die molds or plates 100, 200 and 500, and FIGS. 15–16 depict respective floor mats 300, 400 having preferred protrusion patterns 102, 202, 302, 402, 502 made up of groups 104, 204, 304, 404, 504 and rows 106, 206, 306, 406, 506 of groups of protrusion forming openings 108, 208, 508, and protrusions 308, 408, respectively, which preferably have a star shape.

DETAILED DESCRIPTION OF THE INVENTION

As previously indicated, in the preferred embodiment of the present invention the base material for the first foam rubber layer is acrylonitrile-butadiene rubber (NBR) or styrene-butadiene rubber (SBR). Other materials which may also be used include, by way of example, hydrogenated NBR, carboxylated NBR, EPDM, and generally any other standard types of rubbers which may be formed in a foam state. As will be appreciated, the use of NBR or SBR is desirable from a cost perspective.

The present invention makes use of the addition of chemical blowing agents to the rubber materials ultimately yielding a lighter rubber sheet. Specifically, the rubber backing sheet of the present invention comprises either NBR or SBR or both mixed with a blowing agent. The rubber/blowing agent mixture is thereafter calendared as a solid sheet of unvulcanized. In practice, the raw NBR is believed to be available from Miles Inc. Rubber Division in Akron, Ohio. The SBR may be purchased from Goodyear Tire and Rubber Company in Akron, Ohio. EPDM may also be added in a preferred embodiment to provide ozone resistance and other properties.

In the preferred practice of the present invention, a masterbatch of the polymer components is first prepared by mixing the base rubber (either NBR or SBR) with the additive ozone resistant polymer (EPDM) in the desired ratio along with various stabilizers and processing agents. Exemplary compositions of the masterbatch for various additive ratios wherein EPDM is mixed with NBR are provided in Table 1A for ratios of NBR to the additive polymer of 9.0 (Column a), 2.3 (Column b) and 1.2 (Column c).

TABLE 1A

| MATERIAL | PARTS BY WEIGHT | | |
|---|---|---|---|
| | a | b | c |
| Rubber (NBR) | 40 | 25 | 50 |
| Additive Rubber (EPDM) | 60 | 75 | 50 |
| Plasticizer | 10 | 5 | 15 |
| Stabilizer | 2 | 2 | 2 |
| Processing Aid | 1.75 | 1.75 | 1.75 |
| Antioxidant | 1.2 | 1.2 | 1.2 |

In the preferred practice the plasticizer which is used is diisononylphthalate. The stabilizer is trinonylphenolphosphate available from Uniroyal Chemical under the trade designation Polyguard. The processing aid is purchased from the R. T. Vanderbilt Company in Norwalk Conn. under the trade designation Vanfree AP-2. The antioxidant is purchased from Uniroyal Chemical under the trade designation Octamine.

Following the mixing of the masterbatch, curative agents are added in a second stage mixing process for formation of the raw rubber compound which forms the backing sheet of the floor covering article of the present invention. An exemplary composition of the raw rubber compound formed in this second stage mixing process is provided in Table 1B.

TABLE 1B

| MATERIAL | PARTS BY WEIGHT |
|---|---|
| Masterbatch Blend | 100 |
| Sulfur | 1.25 |
| Stearic Acid | 1 |
| Carbon Black N-550 | 40 |
| Vulkacit Thiaram MS (TMTM) | 0.5 |
| Zinc Oxide | 5 |
| Blowing Agent | 2.5 |

Exemplary compositions of the masterbatch for various additive ratios of SBR to EPDM are provided in Table 2A in a manner similar to that of Table 1A.

TABLE 2A

| MATERIAL | PARTS BY WEIGHT | | |
|---|---|---|---|
| | a | b | c |
| Rubber (SBR) | 40 | 25 | 50 |
| Additive Polymer (EPDM) | 60 | 75 | 50 |
| Stearic Acid | 1 | 1 | 1 |
| Sunolite 240 | 2 | 2 | 2 |
| Zinc Oxide | 5 | 5 | 5 |
| Carbon Black N-550 | 30 | 30 | 30 |
| Carbon Black N-224 | 60 | 60 | 60 |
| Calcium Carbonate | 35 | 35 | 35 |
| Talc | 30 | 30 | 30 |
| Supar 2280 | 80 | 80 | 80 |

After mixing of the SBR masterbatch, curative agents are preferably added in a second stage mixing process for formation of the raw rubber compound which forms the backing sheet of the floor covering article of the present invention. An exemplary composition of the raw rubber compound formed in this second stage mixing process is provided in Table 2B.

TABLE 2B

| MATERIAL | PARTS BY WEIGHT |
|---|---|
| Masterbatch Blend | 100 |
| Sulfur | 2 |
| Methyl Zimate | 1.25 |
| Butyl Zimate | 1.25 |
| Dibutyl Thiurea | 2.50 |
| Tellurium Diethyldithiocarbanate | 1 |
| Blowing Agent | 2.0 |

As previously indicated and shown above, the first foam rubber layer includes a blowing agent to effectuate the formation of closed gas cells in the rubber during vulcanization. The second solid rubber is thus preferably the same compositions as those listed above but without the addition of a blowing agent. Such a second layer is also preferably calendared to a thickness far thinner than for the first foam rubber layer in order to form the required solid rubber cap. The blowing agent for the first foam rubber layer is preferably a nitrogen compound organic type agent which is stable at normal storage and mixing temperatures but which undergoes controllable gas evolution at reasonably well defined decomposition temperatures. By way of example only and not limitation, blowing agents which may be used include: azodicarbonamide (Celogen AZ-type blowing agents) available from Uniroyal Chemical Inc. in Middlebury Conn. and modified azodicarbonamide available from Miles Chemical in Akron, Ohio under the trade designation Porofor ADC-K.

It has been found that the addition of such blowing agents at a level of between about 1 and about 5 parts by weight in the raw rubber composition yields a rubber sheet having an expansion factor of between about 50 and 200 percent. After the fluxing processes are completed, the uncured first rubber layer containing EPDM and the blowing agent are assembled with the second unvulcanized solid rubber layer placed over the first as previously described. A die, as previously described, is then placed over the second layer. The vulcanization of the two rubber layers is then at least partially effected within the press molding apparatus wherein the applied pressure is between 20 and 40 psi. Under the high temperatures and pressure, the nitrogen which is formed by the blowing agent partly dissolves in the rubber. Due to the high internal gas pressure, small closed gas cells are formed within the first rubber layer as the pressure is relieved upon exit from the press molding apparatus. In an alternative practice a post cure oven may be used to complete the vulcanization of the mat and provide additional stability to the resulting product.

EXAMPLE

Two separate rubber sheet materials are produced by fluxing together the materials as set forth in Table 1A in a standard rubber internal mixer at a temperature of about 280° F. to 300° F. for a period of one to two minutes. EPDM additions were made as shown in Table 1A to yield a ratio of EPDM to NBR of 3.0. Additions of curative agents as provided in Table 1B were then made for two separate rubber sheets, however, the second did not include the blowing agent. The first sheet, including the blowing agent, being an uncured sheet of the fluxed rubber compounds was then calendared to a thickness of about 90 mils, having a width of approximately 3 feet and a length of approximately 4 and-a-half feet. The second sheet, also being uncured, was then calendared to a thickness of about 15 mils and having the same dimension as the first sheet. The first sheet was then covered entirely on its surface with the second sheet. A die mold having a plurality of openings was then placed over the second sheet. The die mold/rubber sheets composite was then cured at a temperature of about 350° F. for fifteen (15) minutes under a pressure of about 40 psi and post-cured at a temperature of about 290° F. at atmospheric pressure for a period of five (5) minutes. The resultant floor mat possessed a border of solid rubber reinforcement around the perimeter of the structure as well as a middle section comprising a plurality of protrusions having a solid rubber cap over a foam rubber core. The first and second layers of rubber became permanently adhered together as well. The resultant mat article provided a significant amount of cushioning.

In accordance with alternative particular examples, the mats of the present invention have overall dimensions of, for example, about 25.6×35.4×0.2 inches (65×90×0.5 cm), 29.5×70.9×0.2 inches (75×180×0.5 cm), and the like. In each of these examples, each of the protrusions have an overall width of about 0.25 inches (0.63 cm) and a height of about 0.12 inches (0.3 cm).

While the invention has been described and disclosed in connection with certain preferred embodiments and procedures, these have by no means been intended to. limit the invention to such specific embodiments and procedures. Rather, the invention is intended to cover all such alternative embodiments, procedures, and modifications thereto as may fall within the true spirit and scope of the invention as defined and limited by the appended claims.

What I/we claim is:

1. A cushioned rubber dust control floor mat comprising a vulcanized rubber mat structure comprising
    a first layer comprised of foam rubber; and
    a second layer comprised of solid rubber;
    and wherein at least a portion of a top surface of the mat includes a plurality of star shaped protrusions and the top surface between the protrusions has a pattern of at least one of raised ribs and recesses.

2. The dust control mat of claim 1, wherein at least one protrusion integrated within said rubber mat structure has a core portion and an outside surface portion, wherein the core portion of said at least one protrusion is comprised of at least a portion of said first layer of foam rubber and wherein the out side surface portion of said at least one protrusion is comprised of at least a portion said second layer of solid rubber.

3. The dust control mat of claim 1, wherein the plurality of protrusions integrated within said rubber mat structure are arranged in a tire tread like pattern of groups and rows of groups.

4. The dust control mat of claim 1, wherein the thickness of the resultant first layer of foam rubber is from about 40 to about 250 mils and the thickness of the resultant second layer of solid rubber is from about 5 to about 35 mils.

5. The dust control mat of claim 1, wherein each of the star shaped protrusions are sized about 0.63×0.3 cm.

6. The dust control mat of claim 1, wherein the mat is sized at least one of about 65×90×0.5 cm and 75×180×0.5 cm.

7. The dust control mat of claim 1, wherein the height of the ribs is about 0.1 cm.

8. The dust control mat of claim 1, wherein the at least one of ribs and recesses are in a diamond shaped crossed pattern.

9. The dust control mat of claim 1, wherein the depth of the recesses is about 0.1 cm.

10. A method of a forming a cushioned dust control mat having a plurality of star shaped protrusions and either raised ribs or recesses between the protrusions, comprising the steps of
    (a) calendering at least a first layer of unvulcanized solid rubber over at least a portion of at least a second layer of unvulcanized rubber further comprising at least one blowing agent to form a closed-cell foam rubber structure upon vulcanization;
    (b) placing a die having at least a first and second side over at least a portion of said first layer of unvulcanized solid rubber, wherein said die has a plurality of star shaped protrusion forming openings and at least one of a plurality of rib forming recesses and a plurality of recess forming ridges to allow for the entry and displacement of molten rubber, and wherein said die is comprised of a material which can withstand vulcanization temperatures and pressures;
    (c) subjecting the resultant composite comprising the calendered first and second layers of unvulcanized rubber and the die to vulcanization temperatures and pressures to (1) attach the first layer of rubber to said second layer of rubber, and (2) to form the plurality of protrusions and at least one of ribs and recesses therebetween.

11. The method of claim 10, wherein each of the resultant rubber protrusions comprises a core of foam rubber and an outside surface of solid rubber.

12. The method of claim 10, wherein the thickness of the resultant first layer of foam rubber is from about 5 to about 500 mils and the thickness the resultant second layer of solid rubber is from about 2 to about 50 mils.

13. The method of claim 10, wherein the overall dimensions of each mat are at least one of about 65×90×0.5 cm and 75×180×0.5 cm.

14. The method of claim 10, wherein each of protrusions has the dimensions of about 0.63×0.3 cm.

15. The method of claim 10, wherein the height of each of the ribs is about 0.1 cm.

16. The method of claim 10, wherein the protrusions are arranged in a tire-tread like pattern of groups and rows of groups.

17. The method of claim 10, wherein the depth of each of the recesses is about 0.1 cm.

18. The method of claim 10, wherein the die includes a plurality of rib forming recesses.

19. The method of claim 10, wherein the die includes a plurality of recess forming ridges.

20. A mat produced by the method of claim 10.

\* \* \* \* \*